June 2, 1970     C. W. MUELLER     3,514,941
CONVEYOR CHAIN LINK AND METHOD OF FORMING SAME
Filed May 24, 1968     2 Sheets-Sheet 1
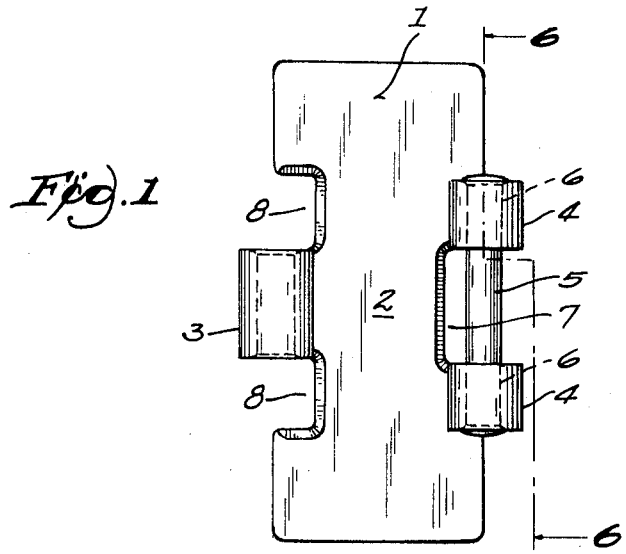
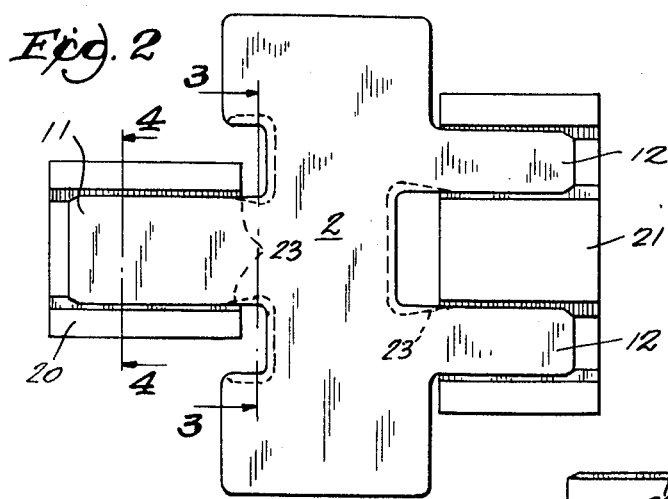 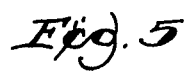
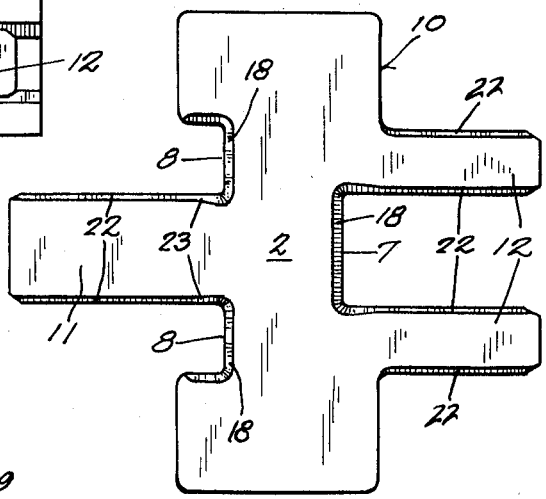
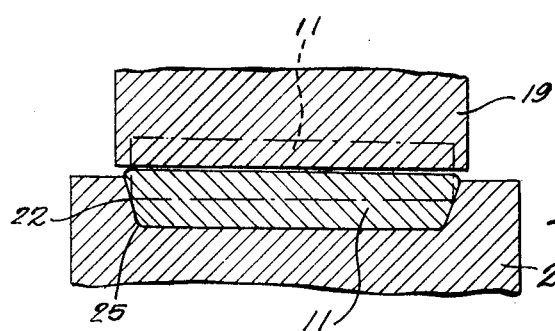 

June 2, 1970   C. W. MUELLER   3,514,941
CONVEYOR CHAIN LINK AND METHOD OF FORMING SAME
Filed May 24, 1968   2 Sheets-Sheet 2

United States Patent Office 3,514,941
Patented June 2, 1970

3,514,941
CONVEYOR CHAIN LINK AND METHOD OF FORMING SAME
Clair W. Mueller, Wauwatosa, Wis., assignor to Rex Chainbelt Inc., Milwaukee, Wis., a corporation of Wisconsin
Filed May 24, 1968, Ser. No. 731,916
Int. Cl. B21l *11/00*
U.S. Cl. 59—35        4 Claims

ABSTRACT OF THE DISCLOSURE

In a flat top conveyor chain with links formed from sheet metal blanks having tongues which are curled to form interfitting, pin-receiving knuckles, improved links whose tongues are formed with swaged beveled edges before curling and the method of so forming said links.

BACKGROUND OF THE INVENTION

Field of invention

The present invention relates to flat top conveyor chains and particularly to the individual links of such chains which are formed from flat sheet metal blanks having oppositely extending tongues which are curled to form knuckles for hinge-like interconnection.

Description of the prior art

Flat top conveyor chains formed of a series of interfitting pin-connected links are known in the art. The links of such chains have flat central body portions and pin-receiving knuckles extending from opposite edges thereof. The knuckles of adjacent links interfit and present aligned bores through which a connecting hinge pin is inserted. Prior art links are formed of metal or molded of plastic or similar material. Chains formed of links of the prior art are either adapted for travel in a straight path only or provided with added clearances between links wherein they may also be operated in a curved path.

When formed of sheet metal, the links of the chains are formed of flat metal blanks having extending tongues which are curled in a forming operation into the knuckles. It is known in the prior art to cold coin or work the metal to provide an impression on one side of a link blank extending from the flat center portion into a central tongue, as taught by U.S. Pat. No. 2,660,292.

When the tongue of a relatively thick metal blank is curled to cylindrical form, the displacement of the metal, occurring as a stretching of the metal on the outside of the curl and a compression of the metal on the inside, causes the ends of the cylinder to bulge laterally and to appear beveled. This bulging is sometimes referred to as bell-mouthing.

The bevel-like bulging of the ends of the curls causes the interfitting knuckles of adjacent links to be spaced apart. This results in larger gaps and decreases the close fit and surface contiguity desirable in flat top conveyor chains. Prior art precurling operations such as that disclosed in the above mentioned patent have not been entirely successful in overcoming the problems caused by the bell-mouthing of a knuckle in a curling operation.

SUMMARY OF THE INVENTION

The present invention provides a method of cold working a sheet metal blank prior to the curling operation whereby bell-mouthing of the curled knuckles is substantially eliminated. The indented margins of the flat center portion of the blank adjacent the tongues are initially beveled in a knifing operation to provide relief from stress concentrations at the corners of the blanks. The lateral edges of the tongues are then beveled, though to a lesser degree, in a die-forming operation also prior to curling. The tongues are curled in a known manner and the resultant knuckles have a well-defined cylindrical appearance and square ends which interfit closely with no appreciable gap. The knuckles at the ends of the bores are chamfered as a result of the die-formed beveling and provide recesses for the enlarged ends of the connecting pins.

BRIEF DESCRIPTION OF THE DRAWINGS

FIG. 1 is a bottom plan view of a flat top conveyor chain link of the present invention.

FIG. 2 is a top plan view of the sheet metal blank shown supported by the dies in which the beveled edges of the tongues are formed.

FIG. 4 is an enlarged cross-section of the die taken on line 4—4 of FIG. 2 and of the tongue as shown in broken lines. The punch and the tongue after being formed in the die are also shown in cross-section.

FIG. 5 is a bottom plan view of the blank shown in FIG. 2 after the knifing and die-forming operations.

DESCRIPTION OF THE PREFERRED EMBODIMENT

Figure 3A:
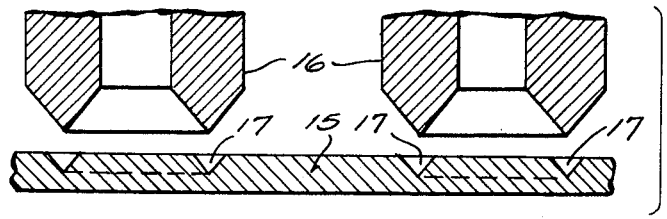
FIG. 3a is an enlarged vertical sectional view taken on line 3—3 of FIG. 2 before the blank is stamped from the sheet metal stock and additionally showing the knifing tools used to bevel the edges of the indented margins.

Referring to the drawing, FIG. 1 shows a flat top conveyor chain link 1 of the present invention. Each link 1 includes a flat central body portion 2, a central curled knuckle 3 extending from one edge of the body portion and a pair of spaced curled knuckles 4 extending from the opposite edge thereof. The central knuckle 3 is adapted to fit between the space knuckles 4 of an adjacent link. A connecting pin 5 is inserted in the aligned bores 6 of the knuckles and in this manner a series of links 1 may be interconnected to form a flat top conveyor chain. Additionally, the edges of the body portion 2 of each link 1 are provided with a central indented margin 7 and a pair of spaced indented margins 8 respectively opposite the central knuckle 3 and the spaced knuckles 4. These margins provide a better interfitting between adjacent links.

A link 1 of the present invention is formed from a blank 10 which is stamped from flat sheet metal stock. As is best shown in FIG. 5, the blank 10 has a body portion 2, and a central tongue 11 and a pair of spaced tongues 12 extending from said body portion. The tongues 11 and 12 are subsequently curled in a known manner to form the knuckles 3 and 4, respectively. The edges of the blank 10 are indented between the spaced tongues 12 and adjacent the central tongue 11 to form the indented margins 7 and 8, respectively.

Figure 7:
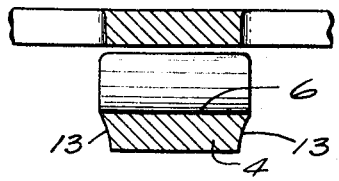
FIG. 7 is an enlarged vertical section through the knuckle of a prior art link showing bell-mouthing of the knuckle.

In the prior art as shown in FIG. 7, when a tongue of rectangular cross section is curled to form a knuckle 4 having a bore 6, the material nearer the axis of the bore is compressed circumferentially and expanded axially, whereas the outer material is in tension and its axial dimension is diminished. As a result there is an axial bulging of the curl at the ends of the bore, also known as bell-mouthing. The bulging produces a beveled end 13 and results in a substantial increase in the lateral spacing between interfitting knuckles.

Before the blank 10, from which a link 1 of the present invention is formed, is stamped from the flat sheet metal stock, the stock is knifed to define the edges of the indented margins 7 and 8. As shown in FIG. 3a the sheet metal stock 15 is impressed with knives 16 to form V-shaped grooves 17. The grooves have a depth of approximately half the thickness of the stock 15 and have a width slightly greater than the depth. By knifing the grooves 17 in the stock before stamping the blanks 10, the substantial amount of material which is displaced by the knifing operation is spread more uniformly across the stock 15 and the distortion of the stock due to pressure and displacement is minimized.

Figure 3:
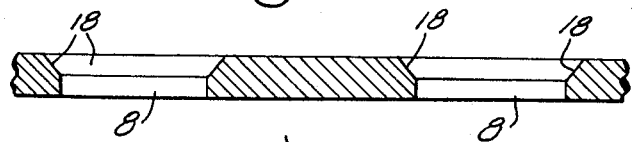
FIG. 3 is an enlarged vertical sectional view taken on line 3—3 of FIG. 2.

After the knifing operation, the blank 10 is stamped from the stock 15 in a manner known in the art. As shown in FIG. 3, the parting line of the blank passes through the center of the grooves 17 of the indented margins 7 and 8 thereby producing continuous knife-formed beveled edges 18 along said margins.

The central tongue 11 and the spaced tongues 12 of the blank 10 are then swaged to form beveled lateral edges by pressing them into dies 20 and 21 respectively, as shown in FIGS. 2, 4 and 5. The bevel of the dies is substantially less than that of the knives 16, being in the range of 10 to 15 degrees. The die-formed beveled edges 22 extend substantially the full length of the tongues 11 and 12 and overlap slightly the adjacent ends of the knife-formed beveled edges 18. Because the angle of the bevel of edges 22 is substantially less than that of edges 18, the knifed edges 18 are feathered as at 23 to provide a uniform transition into the die-formed edges 22.

It is important that the de-formed beveling of the edges of the tongues is done after the knifing and blanking operations and that the opposite edges of each tongue are beveled equally in a single operation. Because the edges 22 are beveled only slightly, they cannot be easily and accurately formed by knifing, as are the edges 18, and are thus better formed in dies. Also, both beveled edges of each tongue must be die formed to equal lengths. If bevels of unequal lengths are formed on a tongue, the greater displacement of material along the edge of the longer bevel will cause the tongue to bow in the direction of the shorter bevel. The tongue then cannot be accurately curled without a straightening operation. Thus, both edges 22 of each tongue 11 or 12 are die-formed with bevels of equal lengths.

Figure 6:
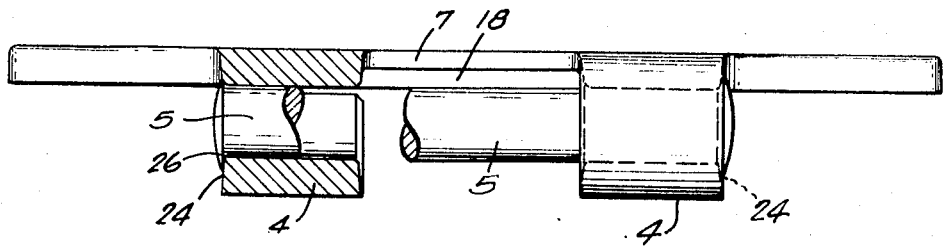
FIG. 6 is an enlarged and elevational view partly in section taken on line 6—6 of FIG. 1 with a portion of the connecting pin broken away.

After the edges of the tongues have been swaged to form the beveled edges 22, the tongues 11 and 12 are curled in a known manner to form the knuckles 3 and 4, respectively. The knuckles so formed are characterized by an absence of bell-mouthing common in curled knuckles of the prior art, as described above and shown in FIG. 7. The tendency of the metal nearer the axis of the bore of the knuckle to exand and bulge axially upon curling is compensated for by the inwardly divergent beveled edges 22. Although axial expansion still occurs upon curling, the consequent bulging does not proceed beyond the lateral edges of the knuckle as defined by the maximum width of the tongue before curling. In other words, the ends 24 of the knuckles are substantially flat or slightly indented as shown in FIG. 6 and as contrasted to the prior art shown in FIG. 7. This allows the knuckles of adjacent links to interfit more closely and eliminates undesireable wide gaps therebetween.

The dies 20 and 21 have slightly rounded corners 25 at the intersections of the beveled sides and the flat bottoms, as shown in FIG. 4. When the tongue, shown in broken lines, is pressed into the die 20 by the punch 19, the squared corners are rounded. After the tongues are curled, the bores 6 of the knuckles have slightly flared portions 26 at their ends which allow the ends of the connecting pin 5 to be staked and spread to provide better pin securement.

The swaging of the tongues 11 and 12 to form the beveled edges 22 produces a work-hardening of the metal. The work-hardening results in an increase in the yield and fatigue strengths of the tongues. The central knuckle 3 is the weakest portion of the link 1 of a conveyor chain and, if a chain fails, failure will most likely occur as a result of the fatigue of the central knuckle 3. The die-formed beveled edges 22 thus materially increase the resistance of the links to failure.

The knife-formed beveled edges 18 of the indented margins 7 and 8 provide clearances for the interfitting knuckles of adjacent links so that the cylindrical outer surfaces of the knuckles may extend slightly under the body portion 2 of the link to which they are connected. The gaps between adjacent interconnected links are thereby minimized. The knifing operation also produces a cold-working and work-hardening of the metal along the indented margins 7 and 8. Thus, by extending the knife-formed beveled edges 18 around the corners of the indented margins 7 and 8, stress concentrations at the corners are relieved with a consequent decrease in the possibility of fatigue cracking.

While the invention has been particularly shown and described with reference to a preferred embodiment thereof, it will be understood by those skilled in the art that various changes in form and details may be made therein departing from the spirit and scope of the invention.

What is claimed is:

1. In the method of forming a stamped sheet metal conveyor chain link of the type having curled knuckles extending from opposite sides of a flat body portion and adapted to be pin-connected to interfitting knuckles of like adjacent links, said method including in a known manner forming a flat blank having projecting tongues and curling the tongues so that the interfitting knuckles have aligned bores, the improved method of forming the knuckles at the ends of the bores with compressively stressed beveled edges which allow the links a closer fit, increase their resistance to fatigue failure and provide recesses for the headed ends of the connecting pins comprising: after blanking but before curling the tongues to form the curled knuckles, swaging the lateral edges of the tongues of the blank by pressing them between the beveled sides of a die so that the metal of the tongue is displaced and compressively stressed longitudinally.

2. In the method of forming a stamped sheet metal conveyor link of the type having curled knuckles and adjacent indented margins to interfit and receive respectively the curled knuckles of similar adjacent links, said method including in a known manner forming a flat blank having projecting tongues and curling the tongues so that the interfitting knuckles have aligned bores, the improved method of forming the knuckles at the ends of the bores and the underside of the link along the indented margins with compressively stressed beveled edges which allow the links a closer fit, improve their resistance to fatigue failure and provide recesses for the headed ends of connecting pins comprising: forming the beveled edges of the indented margins only by knifing the stock before blanking so that the metal of the blank is displaced across the thickness of the blank, and, after blanking but before curling tongues to form the curled knuckles, swaging the several tongues of the blank by pressing them between the beveled sides of a die so that the metal of the tongue is displaced and compressively stressed longitudinally.

3. In a flat blank stamped from sheet metal and having a generally rectangular body portion, a pair of spaced tongues extending from one edge of the body portion and a central tongue extending from the opposite edge thereof, said tongues being subsequently curled to form interfitting pin-receiving knuckles of a flat top conveyor chain link, the improvement comprising beveled edges defining indented margins in said body portion adjacent said tongues and knife-formed on one side of the sheet metal stock before stamping, and swaged beveled lateral edges die-formed in said tongues after stamping and on the same side as said knife-formed beveled edges.

4. A flat blank as in claim 2 wherein the die-formed beveled edges overlap slightly the knife-formed beveled edges to form therewith continuous beveled edges along the swaged and knifed margins of said blank.

References Cited

UNITED STATES PATENTS

| | | | |
|---|---|---|---|
| 2,385,923 | 10/1945 | Klaucke | 59—91 |
| 2,660,292 | 11/1953 | Cheesman | 198—189 |
| 2,852,129 | 9/1958 | Conner | 198—189 |
| 3,144,124 | 8/1964 | Hein | 198—189 |
| 3,442,076 | 5/1969 | Marzo | 59—90 |

CHARLES W. LANHAM, Primary Examiner

G. P. CROSBY, Assistant Examiner

U.S. Cl. X.R.

59—91; 198—189